Jan. 19, 1960  F. PETZOLDT  2,921,364
MULTI-SPINDLE AUTOMATIC LATHE
Filed Feb. 20, 1957  7 Sheets-Sheet 1

Jan. 19, 1960 F. PETZOLDT 2,921,364
MULTI-SPINDLE AUTOMATIC LATHE
Filed Feb. 20, 1957 7 Sheets-Sheet 2

Jan. 19, 1960  F. PETZOLDT  2,921,364
MULTI-SPINDLE AUTOMATIC LATHE
Filed Feb. 20, 1957  7 Sheets-Sheet 7

United States Patent Office 2,921,364
Patented Jan. 19, 1960

2,921,364

MULTI-SPINDLE AUTOMATIC LATHE

Fritz Petzoldt, Leinfelden, Kreis Boblingen, Germany

Application February 20, 1957, Serial No. 641,335

Claims priority, application Germany February 21, 1956

14 Claims. (Cl. 29—43)

The present invention refers to multi-spindle automatic lathes, and more particularly to those having horizontal spindles for bar work or chucking work, with indexing means for revolving a spindle carrier into different work positions.

The invention mainly deals with a novel arrangement and design of the main parts of machines of the type set forth.

The most important main parts of these machines are:

(a) The spindle carrier which is intermittently revolved, according to the number of spindles, in indexed angular steps turning about a central axis so that in every position thereof one selected spindle is positioned opposite one of the tools which are spaced from each other angularly by the same angular amount that is provided for the angular steps of revolving the spindle carrier;

(b) the spindle carrier housing in which the spindle carrier is turnably supported and which also contains the indexing elements required for the revolving operation and for locking the carrier in each position as well as for other operations;

(c) the housing for the longitudinally movable tools or tool spindles which are positioned opposite the work spindles and which are arranged either in the housing itself or in a special tool carrier.

It has been found that conventional machines of this type are not suitable for work of satisfactory accuracy and uniformity. This is partly due to faulty structural arrangement of the above-mentioned main parts in relation to each other entailing the necessity of providing too great a play between sliding parts or between rotating and stationary supporting parts. Partly the drawbacks are due to improper design in view of the effect of thermal conditions chiefly depending upon the rise in temperature of certain parts caused by the operation of the machine.

Therefore, it is an object of the invention to provide a machine of the type set forth in which the shape and the relative arrangement of the main parts like the spindle carrier and the tool carrier as well as the pertaining housings are such that the above mentioned drawbacks are avoided and at the same time the production of the machine is simplified resulting in a reduction of its cost.

It is a further object of the invention to provide a machine of the type set forth which permits operating at comparatively higher speeds than customarily used on this type of machine, without incurring the danger of impairing the accuracy of the work due to thermal conditions.

With the above objects in view a preferred embodiment of the invention is a multi-spindle automatic lathe comprising a central cylindrical supporting member supported in the lathe bed along a supported portion spaced from one end of the cylindrical member so as to leave a free, unsupported portion thereof, a multi-spindle work carrier mounted on said free unsupported portion, a plurality of tool holders and a common tool carrier mounted on said supported portion of the cylindrical supporting means with said tool holders facing the spindles on the multi-spindle work carrier.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 7a shows a third embodiment of the radial support of the spindle carrier;

Figure 5:
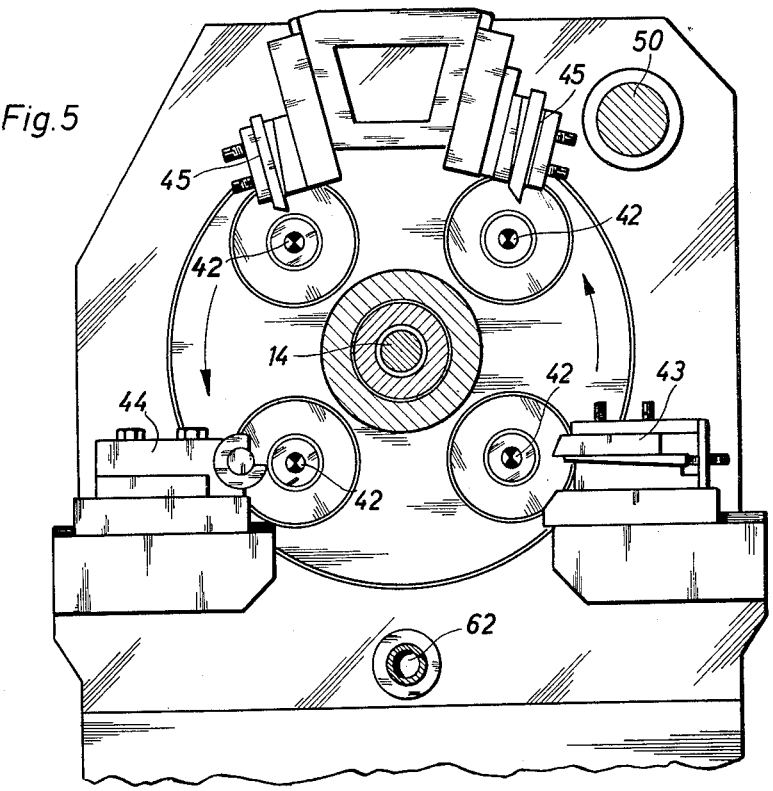
Fig. 5 is a fragmentary section along line 5—5 of Fig. 1.
Figure 1:
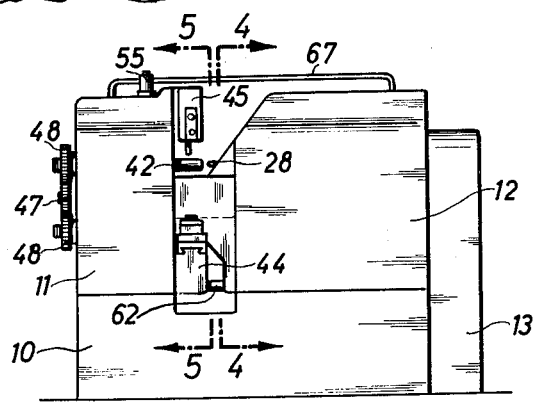
Fig. 1 is a side view of a four-spindle machine according to the invention.

As for the embodiment of the invention according to Figs. 1–6, the four-spindle machine is shown as a complete unit in Fig. 1 in which the machine bed is indicated by 10, a spindle carrier housing 11 and a tool carrier housing 12 being attached to the bed by means not shown. In Figs. 2–6 the lower part of the bed has been omitted for the sake of simplicity, and only the parts arranged above the bed are shown in detail.

Figure 2:
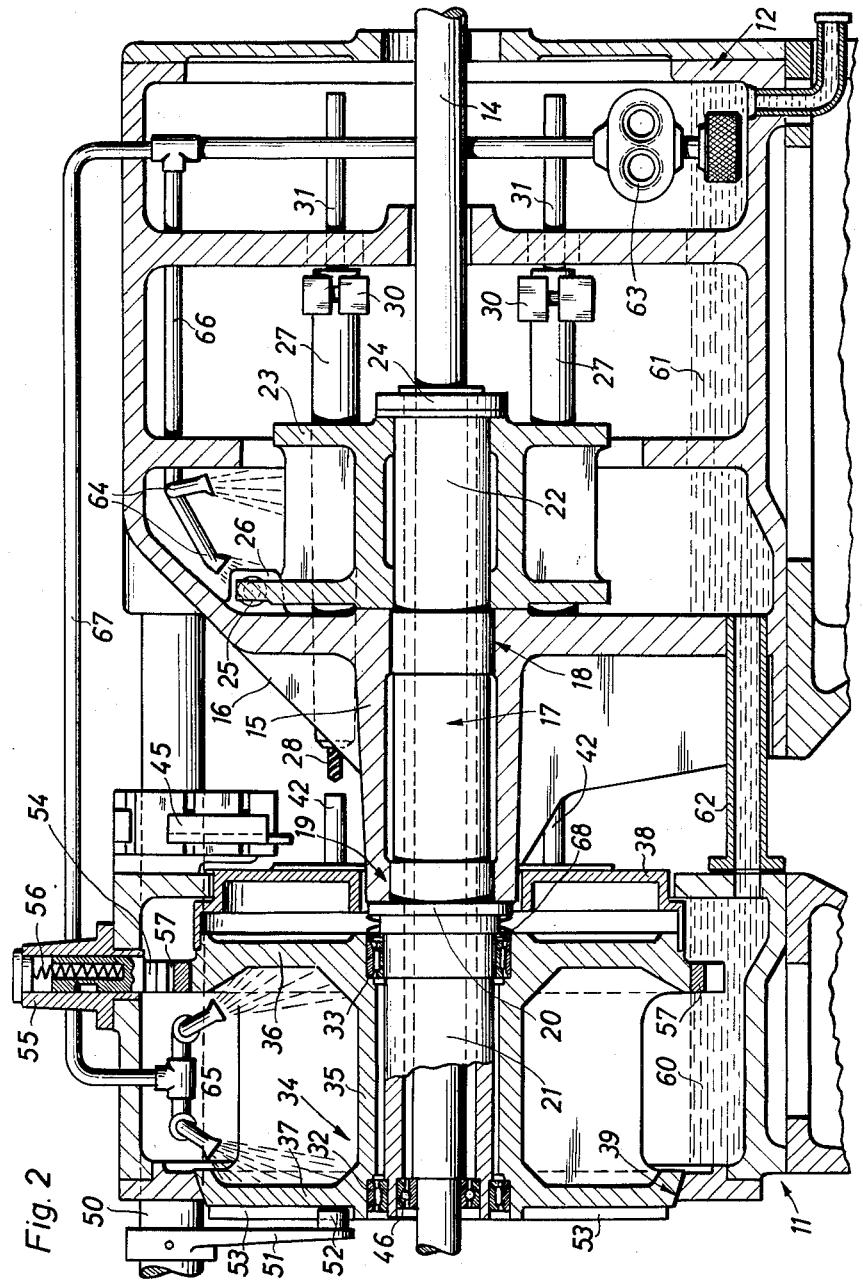
Fig. 2 is a fragmentary section along line 2—2 of Fig. 3.
Figure 6:
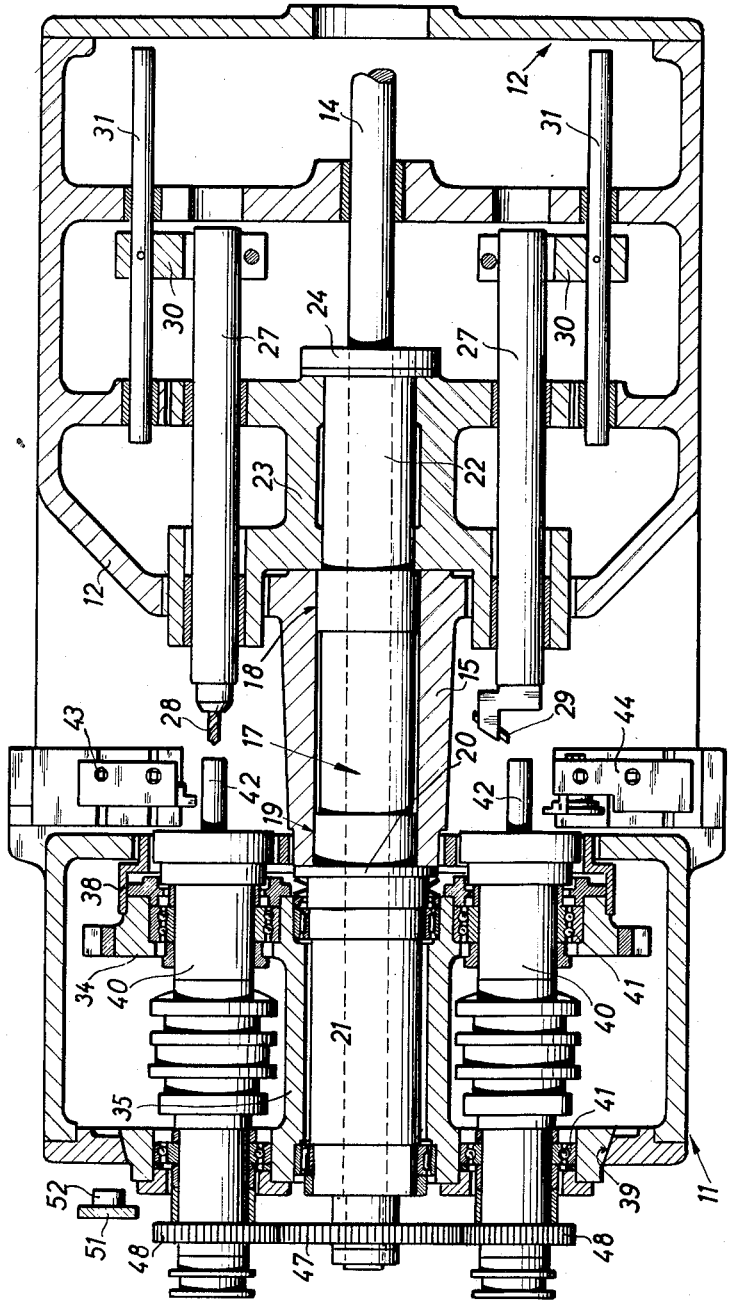
Fig. 6 is a fragmentary section along line 6—6 of Fig. 3.

A motor, not shown, is to be assumed as being located in the bed portion and serves to drive through transmission means located within a drive housing 13 and V-belts a main drive shaft 14 best shown in Figs. 2 and 6. However, in Figs. 2–6 the drive means connected to the shaft 14 are not illustrated.

The tool carrier housing 12 is formed with inner reinforcing ribs or walls as shown. At the left end, as seen in Figs. 2 and 6 the tool carrier housing 12 is formed with a hub portion 15 which is connected by ribs 16 with the housing.

In a bore of the hub 15 a hollow axle 17 is stationarily held in portions 18 and 19 and has a flange 20 which abuts against the end face of the hub 15. A portion 21 of the axle 17 projects beyond the hub 15 towards left, as seen in Figs. 2 and 6, while another portion 22 projects similarly to the right.

A tool carrier 23 is mounted on the axle portion 22 and is securely positioned in the housing 15 by means of a large nut 24 which forces the flange 20 to abut snugly against the hub face so that in this manner the hollow axle 17 and the tool carrier 23 are positioned without relative play. In order to prevent the tool carrier 23 from turning and to connect it rigidly with the housing 15, set screws 25 are provided (see Fig. 4) which lock the tool carrier 23 against lugs 26 located opposite each other in the housing 12. Tool spindles 27 are mounted in the tool carrier 23 and slidably supported in bearings mounted in the tool carrier housing 12. The tool spindles 27 carry at their left ends, as seen in Figs. 2 and 6, the tools 28 and 29, respectively, while connecting pieces 30 are rigidly attached to their right hand ends, for connecting the tool spindles with pusher bars 31 which are slidably arranged in the tool carrier housing 15. These pusher bars 31 are moved in a conventional manner by means not shown. Also means are provided, not shown, for rotating the tools in a conventional manner, if desired.

A spindle carrier 34 is turnably supported on the axle portion 21 by means of roller bearings 32 and 33 and comprises a tubular portion 35 and two flanges 36 and 37. Attached to the flange 36 is a disc-shaped cover piece 38 which shrouds the spindle carrier 34 against the tools and work pieces. The other flange 37 has a conical rim 39 which engages a corresponding conical inner surface of an annular bearing portion of the spindle carrier housing 12.

Four work spindles 40 are supported in the spindle carrier 34 by roller bearings 41 (see Fig. 6). 42 indicates diagrammatically a work piece held by means of a collet and a sleeve type collet closer (not shown) located in the spindle head in a conventional manner. Since these clamping means are known and do not form part of the invention any further description is dispensed with.

For side machining operation the spindle carrier housing is equipped with tool slides as indicated for example at 43, 44 and 45. The details and function of these means are well known in the art and therefore no further details are given in order not to encumber the specification.

Figure 3:
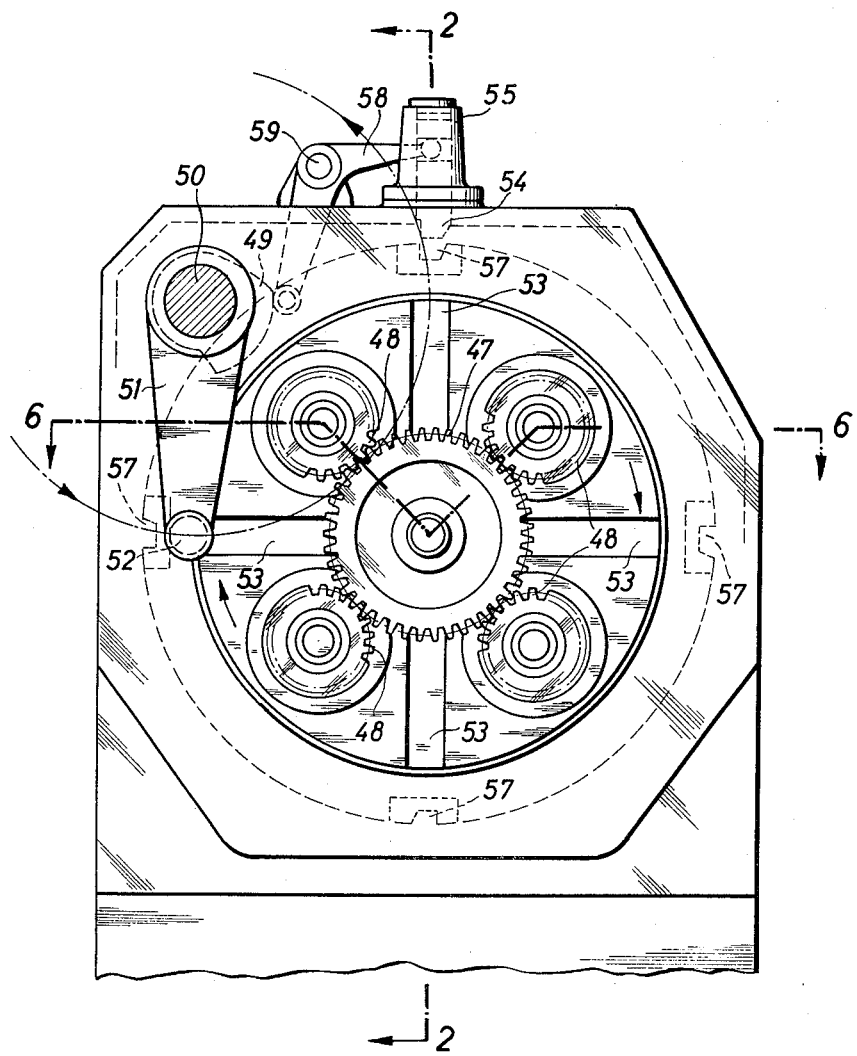
Fig. 3 is a fragmentary section along line 3—3 of Fig. 6.
Figure 4:
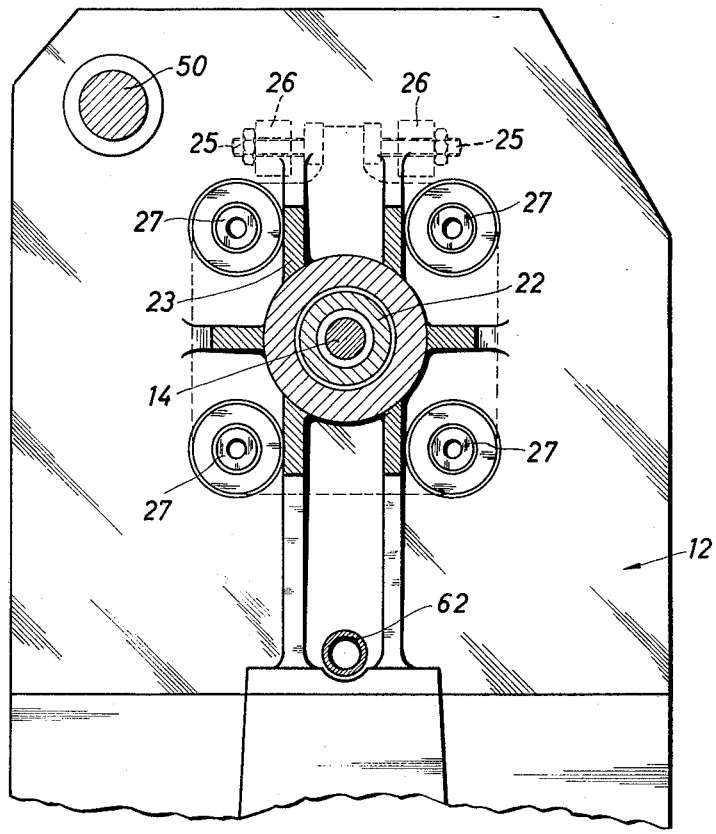
Fig. 4 is a fragmentary section along line 4—4 of Fig. 1.

The work spindles are driven by the above mentioned main shaft 14 which extends through the hollow axle 17 and is supported at its left end, as seen in Fig. 2, by a roller bearing 46. A central gear 47 is mounted on the projecting end of the shaft 14 outside the axle portion 21 and meshes with four gears 48 which are each mounted on the projecting end of one of the work spindles, as shown in Figs. 3 and 6.

The spindle carrier 34 is indexed by a control shaft 50 (Fig. 3) which is moved by conventional means in a well known manner; therefore these means are not shown as they do not constitute a part of the present invention.

An arm 51 is attached to the control shaft 50 and provided with a roller 52 which is adapted to engage a groove 53 of the flange 37 (Figs. 2 and 3) which is provided with four such grooves 53 spaced angularly by 90° from each other, thus constituting a so-called Maltese cross.

The spindle carrier is locked in each working position by means of a locking pin 54 which is carried in an attachment 55 mounted on the spindle carrier housing 11, a compression spring 56 acting upon the pin 54. This pin 54 engages locking notches 57 located along the circumference of the flange 36 and is actuated by a bell-crank lever 58 pivotally mounted on the spindle carrier housing, said lever 58 being controlled by a cam 49 arranged on the control shaft 50.

The spindle carrier housing 11 and the tool carrier housing 12 are partly filled with oil as is indicated at 60 and 61 in Fig. 2, and the two corresponding spaces are connected by a connecting pipe 62 in order to keep the oil level at equal height in both spaces. A pump 63 arranged in the tool carrier housing furnishes oil under pressure via oil lines 66 and 67 to the nozzles 64 and 65. These nozzles are so located that the inner surfaces of the spindle carrier and of the tool carrier are sprayed or flushed with oil.

The oil not only serves to lubricate the sliding parts but also for achieving an equalization of prevailing temperatures as far as the usually warmer spindle carrier and the usually cooler tool carrier are concerned, and this for the purpose of keeping the thermal expansion of these two parts of the machine as equal as possible. The effect of this arrangement can be enhanced even more by providing two pumps with separate suction pipes in such a manner that one pump is located in the spindle carrier housing and one pump in the tool carrier housing, each pump delivering oil to the opposite part of the machine, i.e. from the spindle carrier housing to the tool carrier, and from the tool carrier housing to the spindle carrier.

The conical shape of the rim of the flange 37 results in a perfect support of the spindle carrier in the spindle carrier housing and, besides, this type of support is adapted to carry the load or axial pressure set up by the tools and at the same time to prevent any displacement or shifting of the spindle carrier axis that might otherwise be caused by bending or buckling due to its own weight or due to other forces acting upon it.

During the indexing operation the spindle carrier is pushed only with a limited amount of pressure onto the conical bearing surface 39 of the spindle carrier housing, for instance only by spring members as indicated diagrammatically at 68. It is, however, also possible to provide for controlled positioning of the spindle carrier under pressure towards its seat, either mechanically or hydraulically, which may be combined with means for positively lifting the carrier out of engagement with the conical seat so as to index it freely.

The above described conical bearing 39 may be modified by arranging between the flange 37 and the opposite ring portion of the spindle carrier housing a number of conical rollers. Such rollers are preferably disposed in such a manner that they are capable of taking up the entire pressure and that they may be easily adjusted by non-centric axes for exactly centering the spindle carrier. In either case, the spindle carrier is free to expand radially at its temperature changes without the danger of jamming along the circumference because the above-mentioned conical bearing means of the flange 37 (Fig. 2) permits the spindle carrier to yield in direction to the right without affecting the position of its axis.

Figure 7:
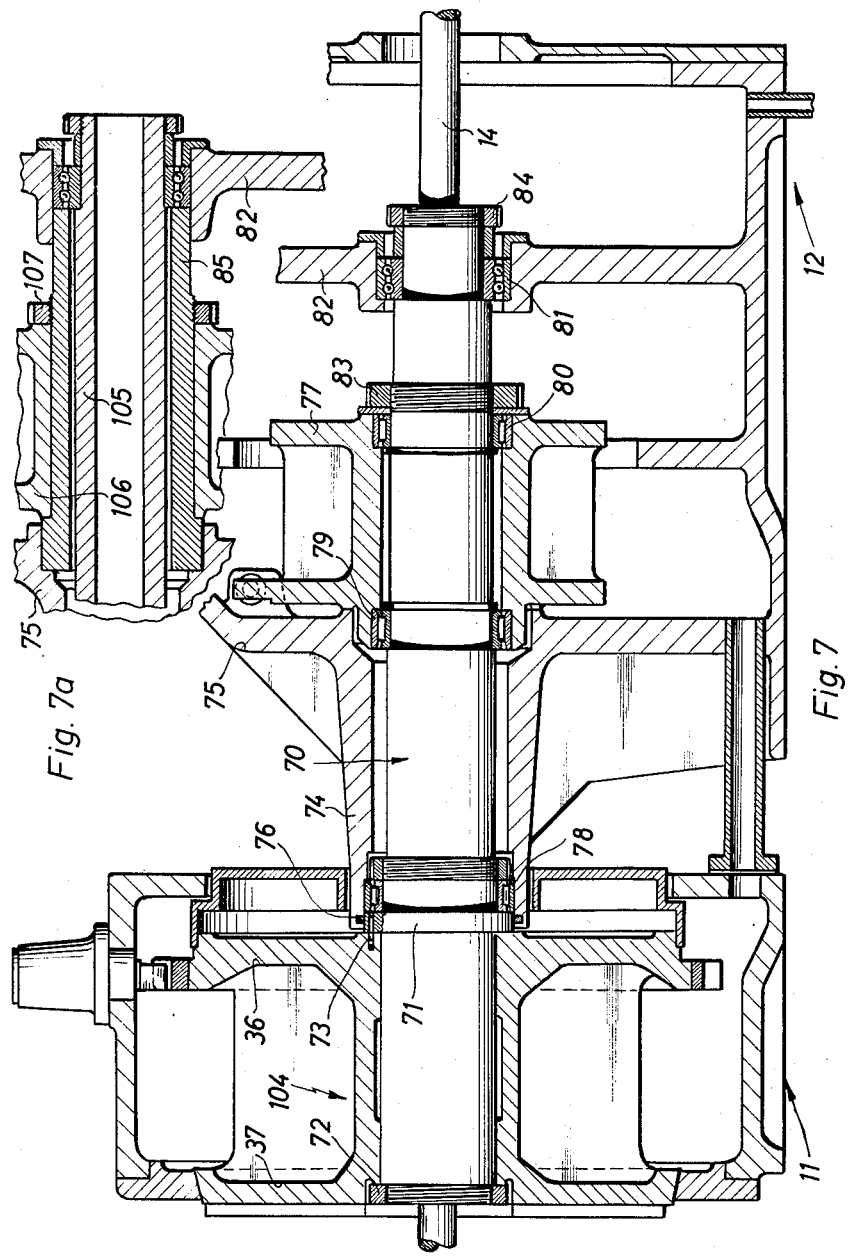
Fig. 7 is a fragmentary section similar to Fig. 5 of a different embodiment of the radial support of the spindle carrier.

Fig. 7 illustrates a different embodiment of a rigid and play-less rotary support of the spindle carrier. Parts which are the same as those in the embodiment according to Figs. 1–6 are indicated by the same reference numerals.

In the example shown by Fig. 7 the spindle carrier 104 is rigidly connected to a turnable hollow axle 70 in such a manner that a flange 71 is tightly pressed against the face of the spindle carrier by means of a nut 72 which is screwed on the left hand end, as seen in Fig. 7, of the hollow axle 70. This hollow axle may be secured against turning relative to the spindle carrier by pins 73. The extension or hub 74 of the tool carrier housing 75 is extended as far as to the flange 71 of the hollow axle 70 and is sealed against the flange by a ring seal 76. The hollow axle 70 is supported in bearings at several places of the tool carrier housing, namely at 78 in the left outer end of the hub and at 81 in a partition wall 82 at the right of the tool carrier 77. A nut 84 serves to hold the inner bearing part on the hollow axle 70.

The tool carrier 77 which is secured against turning in the same manner as shown in Fig. 2 with regard to the first embodiment and is pressed into housing 75 by a nut 83, centrally contacts the hollow axle 70 for instance through roller bearings 79 and 80 so that the hollow axle may turn freely in the tool carrier during indexing, yet supporting the tool carrier at all times.

Fig. 7a illustrates an alternative to the structure of Fig. 7 regarding the support of the tool carrier. In this case the tool carrier 106 is not supported directly by the hollow axle 105 but is mounted on an intermediate sleeve 85. This sleeve is mounted with press fit in bores of the walls 75 and 82 of the tool carrier housing. The position of the tool carrier 106 on the sleeve 85 is fixed by a nut 107.

Figure 8:
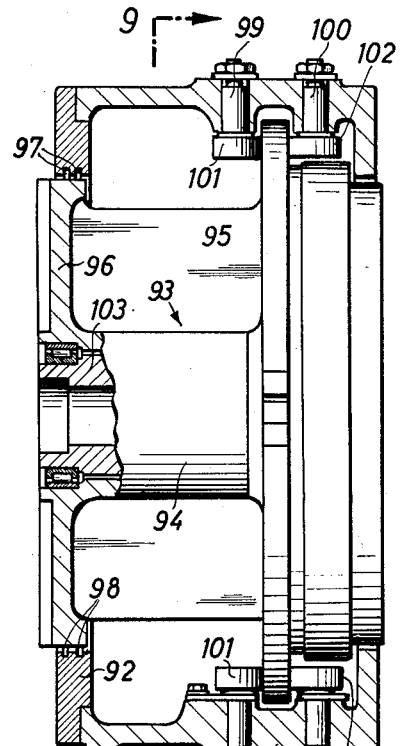
Fig. 8 is a sectional view of a different embodiment of the axial support of the spindle carrier.
Figure 9:
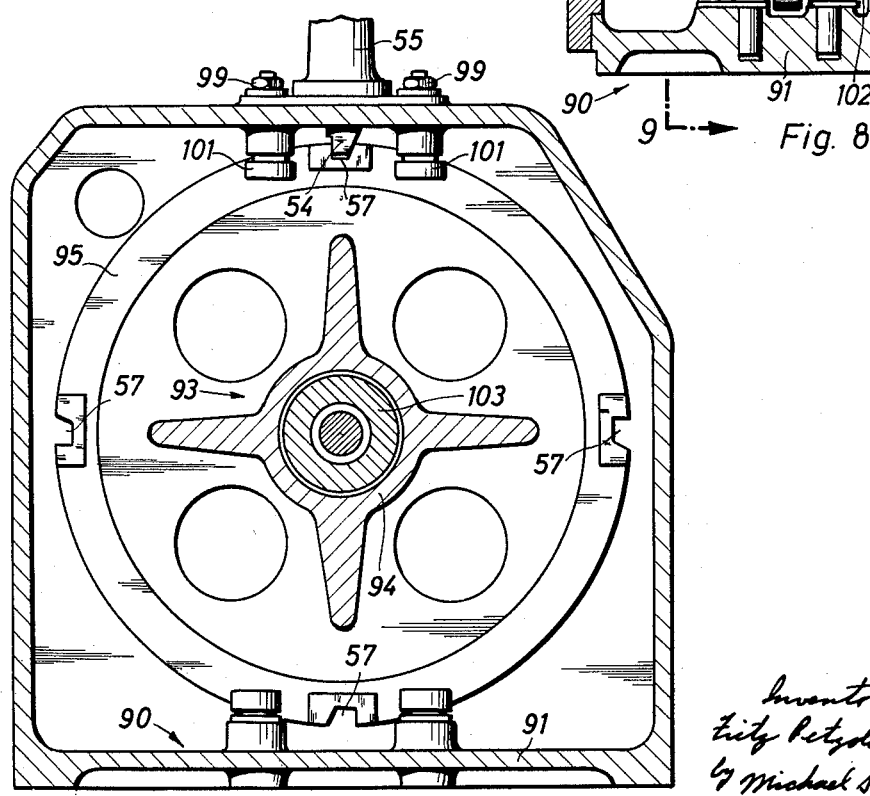
Fig. 9 is a sectional view taken along line 9—9 of Fig. 8.

Figs. 8 and 9 illustrate another embodiment of the means for supporting the spindle carrier in the spindle carrier housing. The spindle carrier housing 90 comprises a main frame 91 and a flange 92 which is attached to the outer end of the spindle carrier housing. The spindle carrier 93 comprises a bearing portion 94 and two flanges 95 and 96. The flange 96 is of cylindrical shape and enough play is provided between the outer edge of the flange 96 and the inner edge of the flange 92 that no friction can develop between these parts. Ring seals 98 may be provided in grooves 97 so as to seal off the spindle carrier housing against the outside. Roller bearings support the carrier 96 on the axle 103 in the same manner as described with respect to Fig. 2. In the main frame 91 a number of excenter bolts 99 and 100 are turnably arranged in planes perpendicular to the main axis and spaced from each other, and are provided with rollers 101 and 102, respectively, at their inner ends. By turning the excentric bolts these rollers can be adjusted to bear closely on the opposite faces of the flange 95 whereby the axial position of the spindle carrier is securely fixed. Since the rollers 101 and 102 engage the spindle carrier at comparatively great distance from the axis, they also serve to prevent bending of the spindle carrier and of the hollow axle 103 supported inside the carrier. Expansion of the carrier 94 may take place without adverse effect.

It can be seen that in a machine according to the invention the drum-shaped spindle carrier is supported in its housing without play which is made possible by its being supported, preferably with pre-tensioned roller bearings, on a strong central axle which is itself secured in position. Therefore the spindle carrier is able to expand freely at rising temperatures in radial direction while remaining centered, which was not possible with known machines where the spindle carrier was supported, without an axle, along its circumference and where considerable play had to be allowed along this circumference.

Moreover, the tools operating in axial direction are held and supported in a housing which is mounted opposite the spindle carrier housing and in relation to the same axle so that proper alignment of tools and spindles can be achieved with maximum accuracy. Thermal expansion of the tool carrier occurs in the same direction as in the spindle carrier.

The spindle carrier is preferably supported also in the area of its rear end along a comparatively large diameter, and preferably by conical bearing means against which the spindle carrier is continuously pressed. Therefore also in this area the spindle carrier is supported at all times without play since this arrangement permits the spindle carrier even in the case of thermal expansion and contraction to bear snugly against the conical supporting surface. Minute axial movements of portions of the spindle carrier are not detrimental, the important factor being that the carrier is always kept centered and that the position of its axis of rotation is permanently maintained unchanged instead of being exposed to displacements as in known types of machines.

Due to the fact that by means of supporting the spindle carrier on an axle near its center the carrier can be made considerably larger in diameter, the locking means can be arranged to engage the spindle carrier along a larger diameter and therefore hold the carrier in the selected index positions much more accurately.

Since differences between the thermal expansion of various cooperating parts of the machine are one of the main causes of inaccuracies of the machining operation, the machine according to the invention is improved further by providing means for reducing as much as possible temperature differences between important sections of the machine. This applies particularly to the spindle carrier and to the tool carrier. It is evident that if both these elements expand substantially the same amount in radial direction the relative position of tools and work spindles will be affected to the least degree when during operation the temperature of the above-mentioned elements of the machine changes either by increasing or by decreasing. Therefore, the provision of an oil circulation system moving oil as a heat carrier from areas tending to have higher temperatures to areas tending to have lower temperatures, and vice versa, is of great advantage. Besides, this heat exchange system together with the previously mentioned structural arrangement permits the use of substantially higher work speeds in the machine according to the invention than was regarded permissible in machines of the known type where the temperature rise had to be kept low.

It is to be noted also that according to the invention the locking or indexing means are arranged in such a manner that they act in radial direction on the spindle carrier so that in the case of thermal expansion or contraction of the latter the same angular position of the spindle carrier is assured in any selected index position no matter what is the prevailing temperature of the spindle carrier and of the indexing means.

It will be understood that each of the elements described above, or two or more together, may also find a useful application in other types of automatic lathes differing from the types described above.

While the invention has been illustrated and described as embodied in multi-spindle automatic lathes, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a multi-spindle automatic lathe for bar and chuck work, in combination, a central cylindrical supporting member; a lathe bed supporting said central cylindrical supporting member along a supported central portion thereof spaced from either end of said central cylindrical member so as to leave at either end a free unsupported portion thereof; a multi-spindle work carrier mounted on and substantially supported by one of said free unsupported portions of said cylindrical supporting member, said work carrier being radially spaced along its circumference from said frame; a plurality of tool holders; and a common tool carrier mounted on the other one of said unsupported portions of said cylindrical supporting means with said tool holders facing the spindles on said multi-spindle work carrier mounted on said one free unsupported portion of said cylindrical supporting means.

2. In a multi-spindle automatic lathe for bar and chuck work, in combination, a frame including a lathe bed; a central cylindrical supporting member mounted on said frame and having a first overhung portion at one end and a second overhung portion at the other end; a multi-spindle work carrier rotatably supported by said first overhung portion of said cylindrical supporting member and including spindles located equidistant from the axis of said cylindrical supporting member, said work carrier being radially spaced along its circumference from said frame; a plurality of tool holders; and a common tool carrier mounted on said second overhung portion of said cylindrical supporting member and supporting said plurality of tool holders facing said spindles on said multi-spindle work carrier and at the same distance from said axis of said cylindrical supporting member as said spindles of said work carrier are spaced therefrom, whereby work pieces carried by said spindles on said work carrier and corresponding tools carried by work holders on said common tool carrier will permanently remain equidistant and in identical relative position to each other despite thermal expansion of both carriers due to temperature changes.

3. In a multi-spindle automatic lathe for bar or chuck work, in combination, a frame including a lathe bed; a central cylindrical supporting member stationarily mounted on said frame and having a first overhung portion at one end and a second overhung portion at the other end; a multi-spindle work carrier rotatably supported by said first overhung portion of said cylindrical supporting member and including spindles located equidistant from the axis of said cylindrical supporting member, said work carrier being radially spaced along its circumference from said frame; a plurality of tool holders; and a common tool carrier stationarily mounted on said second overhung portion of said cylindrical supporting member and supporting said plurality of tool holders facing said spindles on said multi-spindle work carrier and at the same distance from said axis of said cylindrical supporting member as said spindles of said work carrier are spaced therefrom, whereby work pieces carried by said spindles on said work carrier and corresponding tools carried by work holders on said common tool carrier will permanently remain equidistant and in identical relative position to each other despite thermal expansion of both carriers due to temperature changes.

4. In a multi-spindle automatic lathe for bar and chuck work, in combination, a frame including a lathe bed; a central cylindrical supporting member turnably mounted on said frame and having a first overhung portion at one end and a second overhung portion at the other end; a multi-spindle work carrier fixedly mounted on said first overhung portion of said cylindrical supporting member and including spindles located equidistant from the axis of said cylindrical supporting member, said work carrier being radially spaced along its circumference from said frame; a plurality of tool holders; and a common tool carrier turnably mounted on said second overhung portion of said cylindrical supporting member and supporting said plurality of tool holders facing said spindles on said multi-spindle work carrier and at the same distance from said axis of said cylindrical supporting member as said spindles of said work carrier are spaced therefrom, whereby work pieces carried by said spindles on said work carrier and coresponding tools carried by work holders on said common tool carrier will permanently remain equidistant and in identical relative position to each other despite thermal expansion of both carriers due to temperature changes.

5. In a multi-spindle automatic lathe for bar and chuck work, in combination, a frame including a lathe bed; a central cylindrical supporting member mounted on said frame and having a first overhung portion at one end and a second overhung portion at the other end; a multi-spindle work carrier rotatably supported by said first overhung portion of said cylindrical supporting member and including spindles located equidistant from the axis of said cylindrical supporting member, said work carrier being radially spaced along its circumference from said frame; a plurality of tool holders; and a common tool carrier mounted on said second overhung portion of said cylindrical supporting member and supporting said plurality of tool holders facing said spindles on said multi-spindle work carrier and at the same distance from said axis of said cylindrical supporting member as said spindles of said work carrier are spaced therefrom; a tool carrier housing mounted on said lathe bed and enclosing said tool carrier, said cylindrical supporting member being supported in a portion of said tool carrier housing extending between said carriers, whereby work pieces carried by said spindles on said work carrier and corresponding tools carried by work holders on said common tool carrier will permanently remain equidistant and in identical relative position to each other despite thermal expansion of both carriers due to temperature changes.

6. In a multi-spindle automatic lathe for bar and chuck work, in combination, a frame including a lathe bed; a central cylindrical supporting member mounted on said frame and having a first overhung portion at one end and a second overhung portion at the other end; a multi-spindle work carrier rotatably supported by said first overhung portion of said cylindrical supporting member and including spindles located equidistant from the axis of said cylindrical supporting member, said work carrier being radially spaced along its circumference from said frame; a plurality of tool holders; a common tool carrier mounted on said second overhung portion of said cylindrical supporting member and supporting said plurality of tool holders facing said spindles on said multi-spindle work carrier and at the same distance from said axis of said cylindrical supporting member as said spindles of said work carrier are spaced therefrom, and a main shaft for driving said spindles, said cylindrical supporting member being hollow and said main shaft extending through said hollow supporting member, whereby work pieces carried by said spindles on said work carrier and corresponding tools carried by work holders on said common tool carrier will permanently remain equidistant and in identical relative position to each other despite thermal expansion of both carriers due to temperature changes.

7. In a multi-spindle automatic lathe for bar and chuck work, in combination, a frame including a lathe bed; a central cylindrical supporting member mounted on said frame and having a first overhung portion at one end and a second overhung portion at the other end; a multi-spindle work carrier rotatably supported by said first overhung portion of said cylindrical supporting member and including spindles located equidistant from the axis of said cylindrical supporting members, said work carrier being radially spaced along its circumference from said frame; a spindle carrier housing mounted on said lathe bed and enclosing said multi-spindle work carrier, said spindle carrier housing including means for supporting said multi-spindle work carrier against the axially directed load imposed thereon during operation by the action of tools carried by said tool holders; a plurality of tool holders; and a common tool carrier mounted on said second overhung portion of said cylindrical supporting member and supporting said plurality of tool holders facing said spindles on said multi-spindle work carrier and at the same distance from said axis of said cylindrical supporting member as said spindles of said work carrier are spaced therefrom, whereby work pieces carried by said spindles on said work carrier and corresponding tools carried by work holders on said common tool carrier will permanently remain equidistant and in identical relative position to each other despite thermal expansion of both carriers due to temperature changes.

8. In a multi-spindle automatic lathe for bar and chuck work, in combination, a frame including a lathe bed; a central cylindrical supporting member mounted on said frame and having a first overhung portion at one end and a second overhung portion at the other end; a multi-spindle work carrier rotatably supported by said first overhung portion of said cylindrical supporting member and including spindles located equidistant from the axis of said cylindrical supporting member, said work carrier being radially spaced along its circumference from said frame; a spindle carrier housing mounted on said lathe bed and enclosing said multi-spindle work carrier; a plurality of tool holders; and a common tool carrier mounted on said second overhung portion of said cylindrical supporting member and supporting said plurality of tool holders facing said spindles on said multi-spindle work carrier and at the same distance from said axis of said cylindrical supporting member as said spindles of said work carrier are spaced therefrom, said multi-spindle work carrier and said spindle carrier housing being provided with mutually engaging conical supporting surfaces concentric with said axis of said cylindrical supporting member, so that in the case of thermal expansion of at least one of carriers said multi-spindle work carrier is nevertheless maintained in concentric position with respect to said axis through the mutual contact of said conical surfaces whereby work pieces carried by said spindles on said work carrier and corresponding tools carried by work holders on said common tool carrier will permanently remain equidistant and in identical relative position to each other despite thermal expansion of both carriers due to temperature changes.

9. In a multi-spindle automatic lathe for bar and chuck work, in combination, a frame including a lathe bed; a central cylindrical supporting member mounted on said frame and having a first overhung portion at one end and a second overhung portion at the other end; a multi-spindle work carrier rotatably supported by said first overhung portion of said cylindrical supporting member and including spindles located equidistant from the axis of said cylindrical supporting member, said work carrier being radially spaced along its circumference from said frame, said work carrier including a pressure plate extending transversely of said axis of said cylindrical supporting member and having two faces facing in opposite directions, each including a plurality of points located on a circle concentric with and perpendicular to said axis; a spindle carrier housing mounted on said lathe bed and enclosing said multi-spindle work carrier, said spindle carrier housing including means for applying pressure against the pressure plate at a plurality of said points of said faces simultaneously from opposite sides in direction parallel with said axis so that the axis of said multi-spindle work carrier is prevented from being displaced from its correct position; a plurality of tool holders; and a common tool carrier mounted on said second overhung portion of said cylindrical supporting member and supporting said plurality of tool holders facing said spindles on said multi-spindle work carrier and at the same distance from said axis of said cylindrical supporting member as said spindles of said work carrier are spaced therefrom, whereby work pieces carried by said spindles on said work carrier and corresponding tools carried by work holders on said common tool carrier will permanently remain equidistant and in identical relative position to each other despite thermal expansion of both carriers due to temperature changes.

10. In a multi-spindle automatic lathe for bar and chuck work, in combination, a frame including a lathe bed; a central cylindrical supporting member mounted on said frame and having a first overhung portion at one end and a second overhung portion at the other end; a multi-spindle work carrier rotatably supported by said first overhung portion of said cylindrical supporting member and including spindles located equidistant from the axis of said cylindrical supporting member, said work carrier being radially spaced along its circumference from said frame, said work carrier including a pressure plate extending transversely of said axis of said cylindrical supporting member and having two faces facing in opposite directions, each including a plurality of points located on a circle concentric with and perpendicular to said axis; a spindle carrier housing mounted on said lathe bed and enclosing said multi-spindle work carrier, said spindle carrier housing including means for applying pressure against the pressure plate at a plurality of said points of said faces simultaneously from opposite sides in direction parallel with said axis so that the axis of said multi-spindle work carrier is prevented from being displaced from its correct position, said means for applying pressure being rollers adjustably supported in said spindle carrier housing for regulating the pressure applied at said points on either side of said pressure plate; a plurality of tool holders; and a common tool carrier mounted on said second overhung portion of said cylindrical supporting member and supporting said plurality of tool holders facing said spindles on said multi-spindle work carrier and at the same distance from said axis of said cylindrical supporting member as said spindles of said work carrier are spaced therefrom, whereby work pieces carried by said spindles on said work carrier and corresponding tools carried by work holders on said common tool carrier will permanently remain equidistant and in identical relative position to each other despite thermal expansion of both carriers due to temperature changes.

11. A multi-spindle automatic lathe for bar and chuck work comprising, in combination, a frame including a bed; a tool carrier housing mounted on said bed and having a central longitudinal bore; a spindle carrier housing mounted on said bed spaced from said tool carrier housing and having a central longitudinal bore aligned with said central bore of said tool carrier housing; a central cylindrical supporting member mounted within said central bores, said supporting member having a first overhung portion at one end and a second overhung portion at the other end thereof, while being supported between said overhung portions by a portion of said tool carrier housing, said supporting member being secured against relative movement in axial direction; a tool carrier having a central bore mounted in fixed position within said tool carrier housing and surrounding with its central bore said second overhung portion of said cylindrical supporting member in contact therewith, said tool carrier being provided with support means for carrying at least one tool in a position facing said spindle carrier housing and being movable in at least one direction for carrying out machining operations; a multi-spindle work carrier having a central bore mounted within said spindle carrier housing and surrounding with its central bore said first overhung portion of said cylindrical supporting member in contact therewith and supported thereby for turning movement about the axis of said cylindrical supporting member, said spindle carrier being radially spaced along its circumference from said spindle carrier housing and being provided with at least two work spindles rotatably mounted within said spindle carrier in selected positions and parallel with said axis; and control means for turning said spindle carrier into selected positions in which said work spindles are in operative positions in relation to said tools.

12. A multi-spindle automatic lathe for bar and chuck work, comprising, in combination, a frame including a bed; a tool carrier housing mounted on said bed and having a central longitudinal bore; a spindle carrier housing mounted on said bed spaced from said tool carrier housing and having a central longitudinal bore aligned with said central bore of said tool carrier housing; a central cylindrical supporting member mounted within said central bores, said supporting member having a first overhung portion at one end and a second overhung portion at the other end thereof, while being supported between said overhung portions by a portion of said tool carrier housing, said supporting member being secured against relative movement in axial direction; a tool carrier having a central bore mounted in fixed position within said tool carrier housing and surrounding with its central bore said second overhung portion of said cylindrical supporting member in contact therewith, said tool carrier being provided with support means for carrying at least one tool in a position facing said spindle carrier housing and being movable in at least one direction for carrying out machining operations; a multi-spindle work carrier having a central bore mounted within said spindle carrier housing and surrounding with its central bore said first overhung portion of said cylindrical supporting member in contact therewith and supported thereby for turning movement about the axis of said cylindrical supporting member, said spindle carrier being radially spaced along its circumference from said spindle carrier housing and being provided with at least two work spindles rotatably mounted within said spindle carrier in selected positions and parallel with said axis; heat transfer means including at least one pumping device and ducts connected therewith for consecutively bringing a liquid into contact with said tool carrier and said multi-spindle work carrier and for conveying said liquid between said tool carrier and said multi-spindle work carrier so that said tool carrier and said multi-spindle work carrier are kept at substantially equal temperatures during operation; and control means for turning said spindle carrier into selected positions in which said work spindles are in operative positions in relation to said tools.

13. A multi-spindle automatic lathe for bar and chuck work as set forth in claim 11, wherein said tool carrier and said multi-spindle work carrier are formed substantially with a central portion of a selected dimension in radial direction and with flange portions at either end of said central portion, said flange portions having dimensions in radial direction substantially larger than said selected dimension so that a space is left between said flange portions and around said central portion, the surfaces of said flange portions and said central portion surrounding said space being adapted to serve for heat exchange between said portions and a surrounding medium having during operation a temperature different from that of said portions.

14. A multi-spindle automatic lathe for bar and chuck work, as set forth in claim 1, wherein said central cylindrical supporting member is surrounded in the area between said work carrier and said tool carrier by a stationary hub member having one end closely adjacent to said work carrier and being in firm circumferential engagement with said cylindrical supporting member for extending its rigid support in said bed as far as possible towards said first overhung portion carrying said work carrier.

References Cited in the file of this patent

UNITED STATES PATENTS

| | | |
|---|---|---|
| 732,453 | Schulze | June 30, 1903 |
| 1,254,816 | Lees | Jan. 29, 1918 |
| 1,664,374 | Daniels | Mar. 27, 1928 |
| 2,033,490 | Simpson | Mar. 10, 1936 |
| 2,348,364 | Ruppel | May 9, 1944 |
| 2,364,599 | Burrus | Dec. 12, 1944 |
| 2,644,178 | Nielsen | July 7, 1953 |